(12) United States Patent
Akasaka

(10) Patent No.: US 7,038,839 B1
(45) Date of Patent: May 2, 2006

(54) OPTICAL SIGNAL AMPLIFICATION USING MULTIPLE BACKWARD-PUMPING SYSTEMS

(75) Inventor: Youichi Akasaka, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 390 days.

(21) Appl. No.: 10/350,493

(22) Filed: Jan. 24, 2003

(51) Int. Cl.
*H04B 10/12* (2006.01)

(52) U.S. Cl. .................................... 359/334

(58) Field of Classification Search ................ 359/334
See application file for complete search history.

(56) References Cited

U.S. PATENT DOCUMENTS

| | | | |
|---|---|---|---|
| 6,147,794 A * | 11/2000 | Stentz | 359/334 |
| 6,423,963 B1 * | 7/2002 | Wu | 250/227.14 |
| 6,480,326 B1 * | 11/2002 | Papernyi et al. | 359/334 |
| 6,611,368 B1 * | 8/2003 | Grant et al. | 359/334 |
| 6,700,696 B1 * | 3/2004 | Dominic et al. | 359/341.32 |
| 2003/0076577 A1 * | 4/2003 | Dominic et al. | 359/334 |
| 2003/0174938 A1 * | 9/2003 | Headley et al. | 385/27 |

FOREIGN PATENT DOCUMENTS

EP   1026797 A2 *   8/2000

OTHER PUBLICATIONS

Akasaka, Youichi, Huang, Renxiang, and Harris, David, "Novel Pumping Schemes on Distributed Raman Amplifier for 40Gbps Based Terrestrial Network," Sprint, Advanced Technology Labs, Jan. 31, 2002.

Akasaka, Youichi, Huang, Renxiang, Harris, David Yam, Scott and Kazovsky, Leonid, "New Pumping Scheme on Distributed Raman Amplifier Optimized for Novel Transmission Fiber Aimed at 40Gb/s Based Terrestrial Network," Sprint, Advanced Technology Labs, Mar. 17, 2002.

Akasaka, Youichi, Huang, Renxiang, Harris, David, Yam, Scott and Kazovsky, Letter of Recommendation on the submission to OFC-PD of: "New Pumping Scheme on Distributed Raman Amplifier Optimized for Novel Transmission Fiber Aimed at 40Gbps Based Terrestrial Network," Sprint, Advanced Technology Labs, Mar. 17, 2002.

(Continued)

*Primary Examiner*—Mark Hellner
*Assistant Examiner*—Eric Bolda

(57) ABSTRACT

An optical amplification system is disclosed that comprises a first order pump system and a second order pump system. As a fiber span carries an optical signal, the first order pump system and the second order pump system both backward pump onto the fiber span. The first order pump system is set to a low power and the second order pump system is set to a high power. The first and second order pump systems generate a gain in the optical signal near the center of the fiber span based on the low power of the first order pump system and the high power of the second order pump system. The gain near the center of the fiber span is greater than any gain generated near a receiver end of the fiber span.

19 Claims, 4 Drawing Sheets

OTHER PUBLICATIONS

Rottwitt, Karsten, Stentz, Andrew, Nielsen, Torben, Hansen, Per, Feder, Kenneth and Walker, Kenneth, "Transparent 80 km Bi-Directionally Pumped Distributed Raman Amplifier with Second Order Pumping," ECOC Sep. 26-30, 1999, pp. 144-145, Nice, France.

Dominic, Vince, Mathur, Atul, and Ziari, Mehrdad, "Second-order Distributed Raman Amplification With a High-power 1370 nm laser Diode," OAA 2001, OMC6-1-OMC6-3.

Labrunie, L., Boubal, F., Brandon, E., Buet, L., et al., "1.6 Terabit/s (160×10.66 Gbit/s) unrepeatered transmission over 321 km using second order pumping distributed Raman Amplication," Alcatel-Submarine Networks Division, Nozay, France, OAA 2001, PD3-1-3.

* cited by examiner

OPTICAL SIGNAL AMPLIFICATION USING MULTIPLE BACKWARD-PUMPING SYSTEMS

BACKGROUND OF THE INVENTION

1. Field of the Invention

The invention is related to the field of communication systems, and in particular, to a system and method of amplifying an optical signal using multiple backward pumping systems.

2. Statement of the Problem

Many communication companies use fiber optic cabling as a media for transmitting data because of its high-bandwidth capacity. Fiber optic cables reliably transport optical signals over long distances. Over a distance, an optical signal attenuates in the fiber due to Rayleigh scattering. The attenuation may be recovered by an optical amplifier, however, the optical amplifier adds noise to the optical signal. The noise accumulation on the optical signal can especially be a problem for ultra long haul transmissions that have a high bit rate.

Optical amplifiers may be discrete amplifiers or distributed amplifiers. Distributed amplifiers use the transmission fiber, that is carrying the optical signal, as a gain medium. Discrete amplifiers do not use transmission fiber as a gain medium, but use another type of fiber or component as the gain medium.

One type of discrete amplifier is an Erbium-Doped Fiber Amplifier (EDFA). In an EDFA, an Erbium-doped fiber receives optical signals from a transmission fiber. A pump laser transmits a 980 nm laser beam onto Erbium-doped fiber concurrently as the optical signals travel over the Erbium-doped fiber. The properties of the Erbium-doped fiber act to absorb the laser beam and generate a gain in the optical signals using the absorbed laser beam. In this example, the Erbium-doped fiber acts as the gain medium, not the transmission fiber. Unfortunately, EDFA's have a limit on the gain bandwidth they can produce and cannot effectively be used for ultra wide band transmissions.

Another type of discrete optical amplifier is a Raman amplifier. In a discrete Raman amplifier, a fiber span within the Raman amplifier receives optical signals from a transmission fiber. The fiber span may be a highly doped fiber, such as a dispersion compensating fiber. A Raman pump laser backward pumps a laser beam onto the fiber span carrying the optical signals. Based on the "Raman Effect", the laser beam generates a gain in the optical signals traveling on the fiber span. For instance, a 1480 nm laser beam, transmitted over a fiber span carrying optical signals, generates a gain in the optical signals in the range of 1565–1600 nm. The discrete Raman amplifier provides a wider gain bandwidth and allows for replacement of high-powered EDFAs. However, the discrete Raman amplifier generates a higher noise figure than EDFAs.

Raman pump lasers can also be used for distributed amplification. Designers have improved the noise figure problems for distributed Raman amplification using a second order pump. One particular pumping scheme for a distributed Raman amplifier was described in a paper entitled "1.6 Terabit/s (160×10.66 Gbits/s) Unrepeatered Transmission Over 321 km Using Second Order Pumping Distributed Raman Amplification", which was authored by L. Labrunie et.al. and published in OAA '01, PD-3 (Labrunie paper), which is incorporated herein by reference into this application. This scheme involves backward pumping two first order pumps onto a fiber span and also backward pumping a second order pump onto the fiber span. One of the first order pumps has a power of 230 mW at 1425 nm, and the other first order pump has a power of 150 mW at 1455 nm. The second order pump has a power of 1.4 W at 1367 nm. The two first order pumps and the second order pump generate a gain in the optical signals. This configuration is illustrated below in FIG. 1.

One problem with the configuration in the Labrunie paper is that the first order pumps are set to high powers (230 mW and 150 mW), and the first order pumps generate a gain in the optical signals close to a receiver end of the fiber span. The receiver end is the end of the fiber span from which the optical signals exit the fiber span. In generating the gain near the receiver end, the first order pumps also generate noise in the optical signals near the receiver end. Generating the noise near the receiver end can negatively affect the Optical Signal-to-Noise Ratio (OSNR) of the optical signals.

SUMMARY OF THE SOLUTION

The invention helps solve the above problems with a pumping scheme that moves the gain in an optical signal away from the receiver end of a fiber span and more toward the center of the fiber span. Consequently, noise generated on the optical signal is also moved toward the center of the fiber span. Moving the noise toward the center of the fiber span allows the fiber to disperse the noise as the noise travels over the fiber. This advantageously improves the Optical Signal-to-Noise (OSNR) of the optical signal.

One example of the invention comprises an optical amplification system that comprises a first order pump system and a second order pump system. The first order pump system and the second order pump system are coupled to a fiber span carrying an optical signal. The first order pump system backward pumps onto the fiber span and the second order pump system backward pumps onto the fiber span.

The first order pump system is set to a low power. The second order pump system is set to a high power. The first order pump system and the second order pump system generate a gain in the optical signal near the center of the fiber span based on the low power of the first order pump system and the high power of the second order pump system. The first order pump system and the second order pump system may also generate a gain near a receiver end of the fiber span. The low power of the first order pump system and the high power of the second order pump system cause the gain near the center of the fiber span to be greater than any gain generated near the receiver end of the fiber span.

The invention may also include other embodiments described below.

DESCRIPTION OF THE DRAWINGS

The same reference number represents the same element on all drawings.

DETAILED DESCRIPTION OF THE INVENTION

Figure 1:
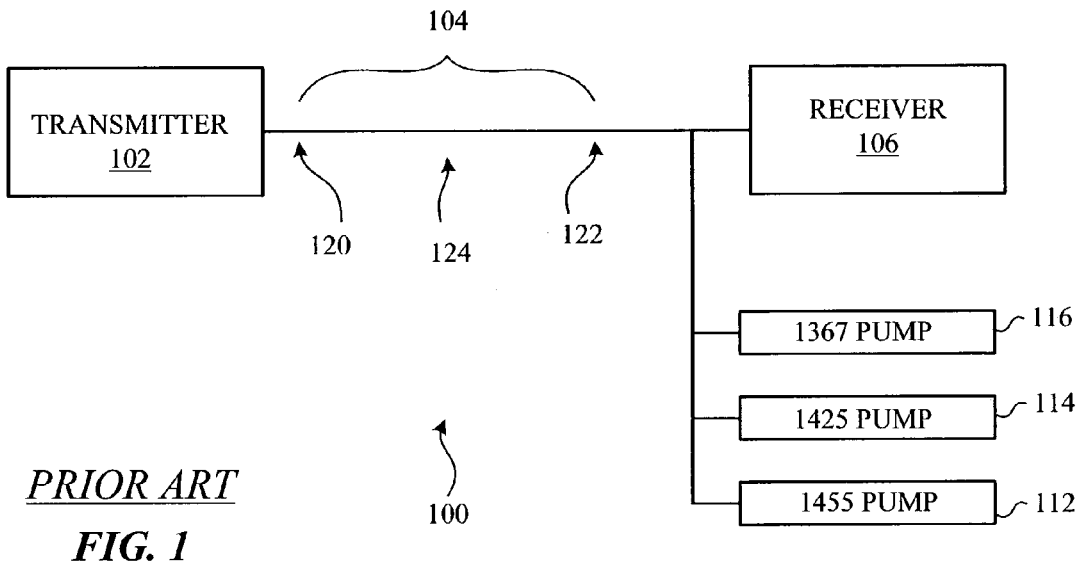
FIG. 1 illustrates an optical communication system in the prior art.
Figure 2:
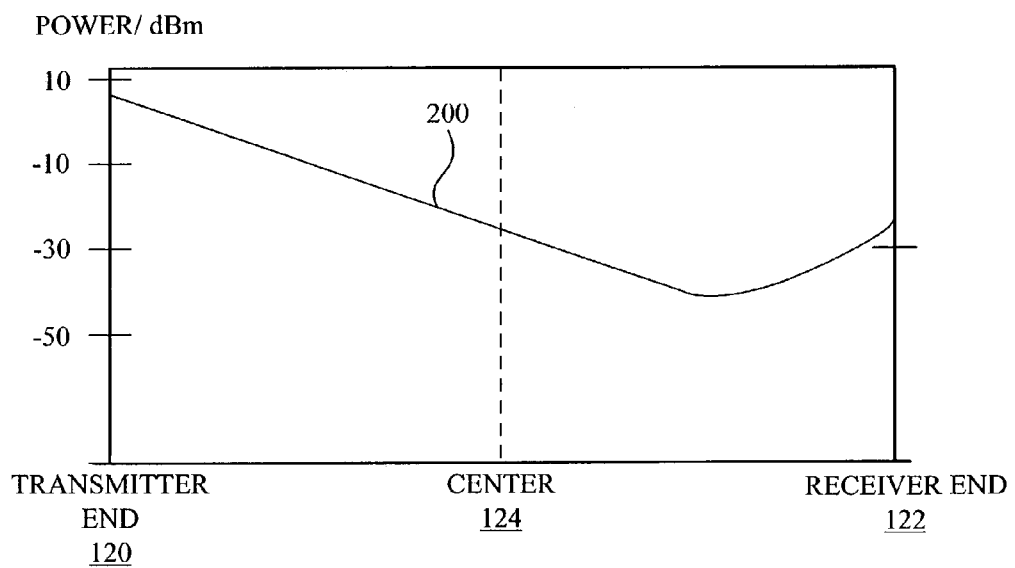
FIG. 2 illustrates the gain of an optical signal traveling on a fiber span in FIG. 1 in the prior art.

FIGS. 1–2 illustrate a prior art optical communication system to help better understand the invention. FIGS. 3–6 and the following description depict specific examples of an optical communication system to teach those skilled in the art how to make and use the best mode of the invention. For the purpose of teaching inventive principles, some conventional aspects of the optical communication system have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Prior Art Optical Communication System—FIGS. 1–2

FIG. 1 illustrates an optical communication system 100 in the prior art. The configuration illustrated in FIG. 1 was described in the Labrunie paper cited in the Background. Optical communication system 100 is comprised of a transmitter 102, a fiber span 104, a receiver 106, a first order pump 112, a first order pump 114, and a second order pump 116. Fiber span 104 includes a transmitter end 120, a center 124, and a receiver end 122.

First order pump 112 is a 1455 nm pump set to a power of 150 mW. First order pump 114 is a 1425 nm pump set to a power of 230 mW. Second order pump 116 is a 1367 nm pump set to a power of 1.4 W.

In operation, transmitter 102 transmits an optical signal to receiver 106 over fiber span 104. First order pump 112, first order pump 114, and second order pump 116 each backward pump laser beams onto fiber span 104. First order pump 114 and second order pump 116 generate a gain in the optical signal traveling on fiber span 104.

FIG. 2 illustrates the gain of the optical signal traveling on fiber span 104 in FIG. 1. Line 200 illustrates the optical signal as it travels from transmitter end 120 of fiber span 104 to receiver end 122. Based on the power settings of first order pump 112 (150 mW), first order pump 114 (230 mW), and second order pump 116 (1.4 W), first order pump 114 and second order pump 116 generate a gain in the optical signal near receiver end 122 of fiber span 104, and do not generate a gain near the center 124 of fiber span 104. However, first order pump 114 and second order pump 116 also generate noise on the optical signal. First order pump 114 and second order pump 116 unfortunately generate the noise at or near receiver end 122 of fiber span 104, which may negatively affect the Optical Signal-to-Noise Ratio (OSNR) of the optical signal and makes it more difficult for receiver 106 to process the optical signal.

Figure 3:
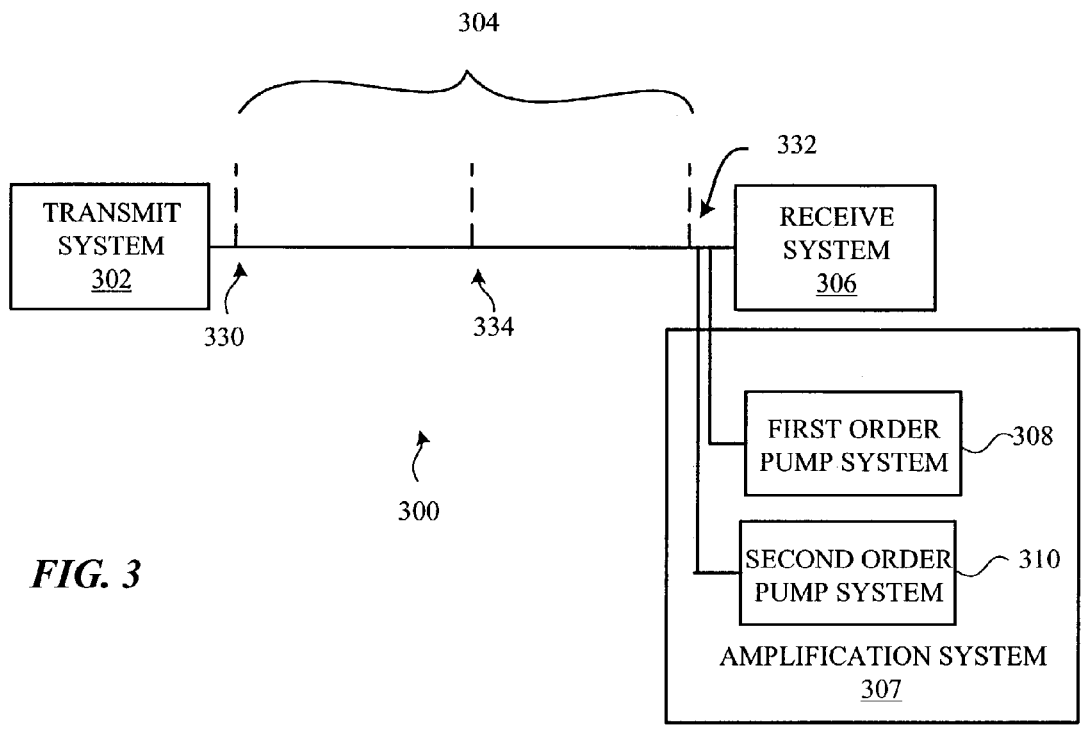
FIG. 3 illustrates an optical communication system in an example of the invention.
Figure 4:
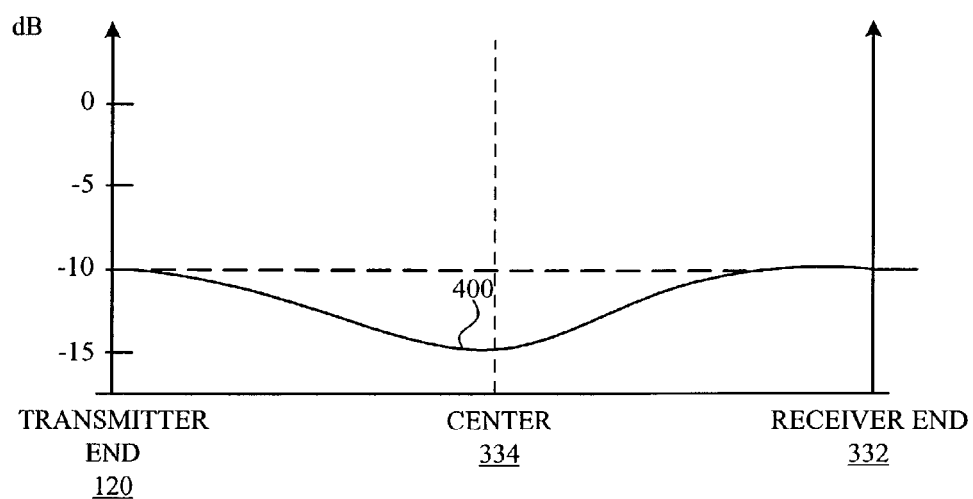
FIG. 4 illustrates a gain of the optical signal traveling on a fiber span in FIG. 3 in an example of the invention.

Optical Communication System—FIGS. 3–4

FIG. 3 illustrates an optical communication system 300 in an example of the invention. Optical communication system 300 is comprised of a transmit system 302, a fiber span 304, a receive system 306, and an amplification system 307. Amplification system 307 is comprised of a first order pump system 308 and a second order pump system 310. Fiber span 304 comprises a transmitter end 330, a center 334, and a receiver end 332.

Transmit system 302 and receive system 306 are coupled to opposite ends of fiber span 304. First order pump system 308 and second order pump system 310 may be coupled at or near receiver end 332 of fiber span 304.

The following definitions may help to clarify the invention. A fiber span comprises a length of optical fiber. Low power refers to a power less than 30 mW. High power refers to a power greater than 400 mW. A gain refers to any increase in an optical signal greater than 1 dB. Backward pump refers to transmitting a light beam onto an optical fiber in a direction opposite to an optical signal traveling on the optical fiber. A center of a fiber span comprises the middle of the length of the fiber span. A transmitter end of a fiber span comprises an end of the fiber span that an optical signal enters the fiber span. A receive end of a fiber span comprises an end of the fiber span that an optical signal exits the fiber span.

In operation, transmit system 302 transmits an optical signal over fiber span 304 to receive system 306. Concurrently, first order pump system 308 backward pumps onto fiber span 304. Second order pump system 310 also backward pumps onto fiber span 304. First order pump system 308 and second order pump system 310 may backward pump from receiver end 332 of fiber span 304. By backward pumping onto fiber span 304, first order pump system 308 and second order pump system 310 generate a gain in the optical signal.

First order pump system 308 is set to a low power. Second order pump system 310 is set to a high power. First order pump system 308 and second order pump system 310 generate the gain in the optical signal near the center 334 of fiber span 304 based on the low power of first order pump system 308 and the high power of second order pump system 310. First order pump system 308 and second order pump system 310 may also generate some gain near receiver end 332 of fiber span 304. In this example of the invention, the gain generated near the center 334 of fiber span 304 is greater than a gain generated near receiver end 332. Based on this disclosure, those skilled in the art will appreciate how to modify existing optical communication systems to make optical communication system 300.

In one example, transmitter end 330, receiver end 332, and the center 334 of fiber span 304 can be further defined as percentages of fiber span 304. The center 334 of fiber span 304 comprises a 50% length of fiber span 304 centered about the middle of fiber span 304. Transmitter end 330 comprises a 25% length of fiber span 304 that begins at transmitter end 330. Receive end 332 comprises a 25% length of fiber span 304 that begins at receiver end 332.

FIG. 4 illustrates a gain in the optical signal traveling on fiber span 304 of FIG. 3 in an example of the invention. Line 400 illustrates the optical signal as it travels from transmitter end 330, over the center 334 of fiber span 304 to receiver end 332 of fiber span 304. Based on the low power of first order pump system 308 and on the high power of second order pump system 310, first order pump system 308 and second order pump system 310 generate the gain near the center 334 of fiber span 304. The gain near the center 334 of fiber span 304 is greater than any gain generated near receiver end 332.

Figure 5:
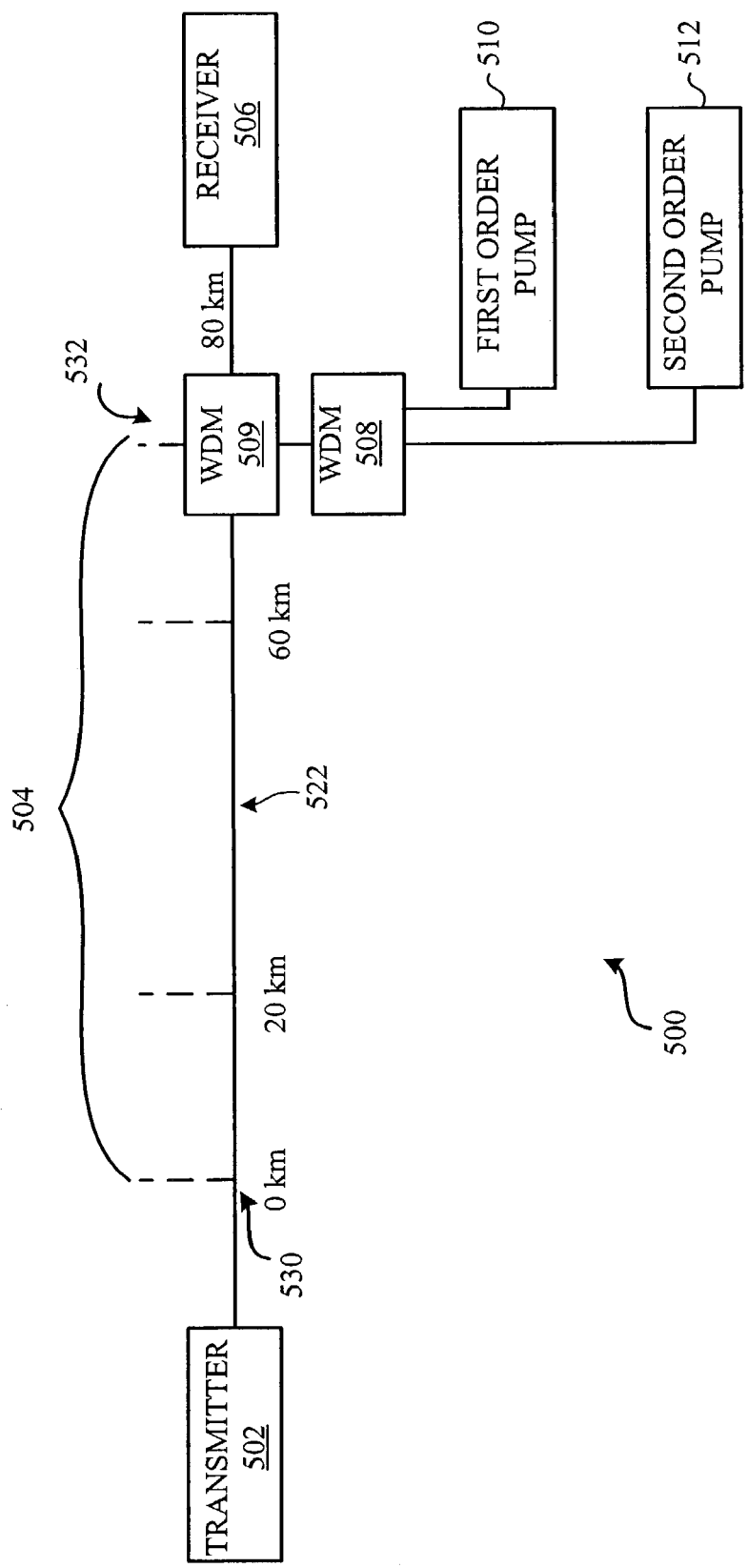
FIG. 5 illustrates an optical communication system in an example of the invention.
Figure 6:
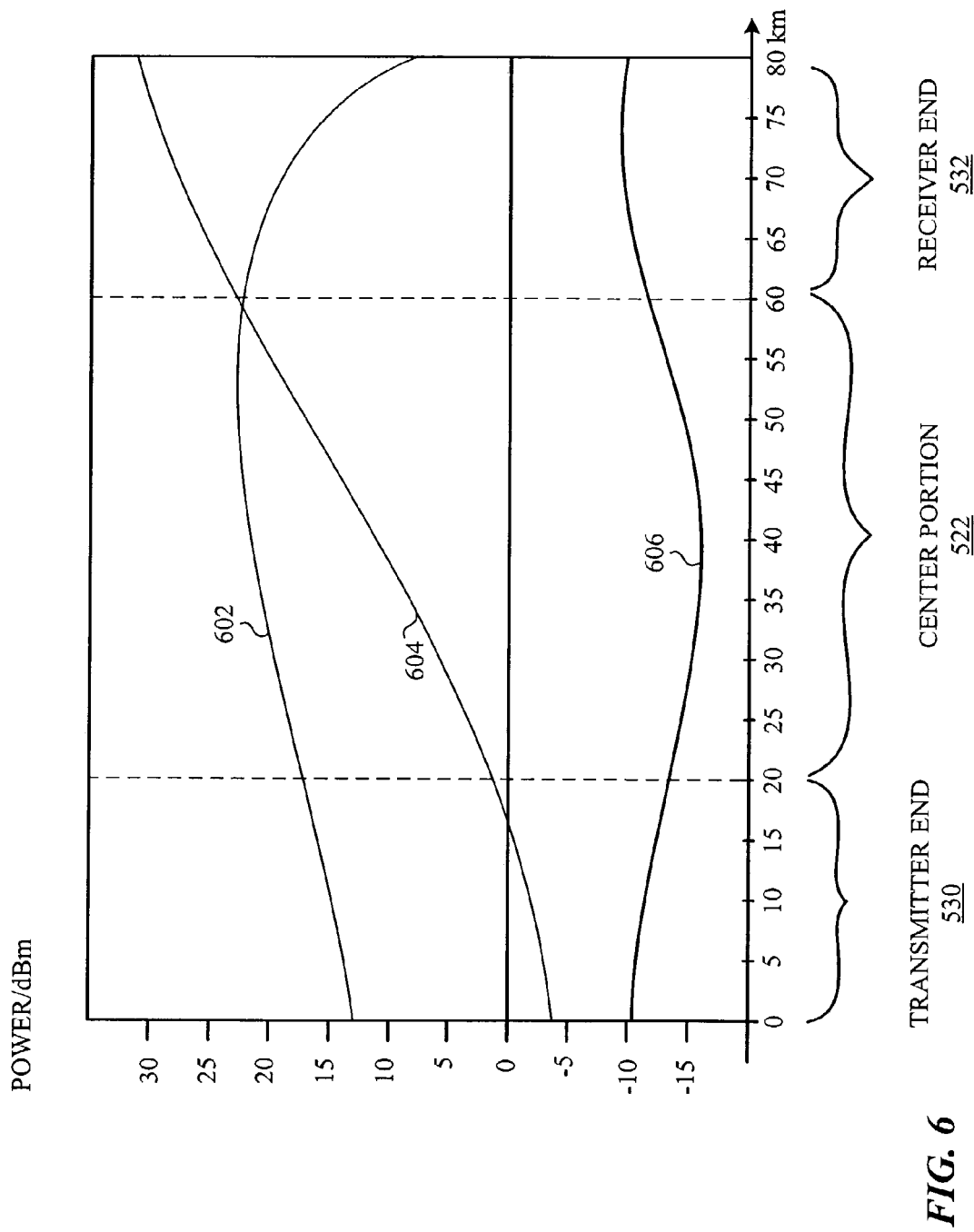
FIG. 6 illustrates a gain of the optical signal traveling on a fiber span in FIG. 5 in an example of the invention.

Optical Communication System—FIGS. 5–6

FIG. 5 illustrates an optical communication system 500 in an example of the invention. Optical communication system 500 is comprised of a transmitter 502, a fiber span 504, a receiver 506, Wavelength Division Multiplexing (WDM) multiplexers 508 and 509, a first order pump 510, and a second order pump 512. Transmitter 502 and receiver 506 are coupled to fiber span 504. WDM mux 509 is coupled WDM mux 508 and is coupled to fiber span 504 at a receiver end 532 of fiber span 504. Pump 510 and pump 512 are coupled to WDM mux 508.

Fiber span 504 comprises a single mode fiber having a length of 80 km. Fiber span 504 includes a transmitter end 530, a center portion 522, a receiver end 532. Transmitter end 530 comprises a section of fiber span 504 beginning at 0 km and extending to 20 km. Center portion 522 comprises a section of fiber span 504 beginning at 20 km and extending to 60 km. Receiver end 532 comprises a section of fiber span 504 beginning at 60 km and extending to 80 km. Pump 510 comprises a 1455 nm Raman pump. Pump 512 comprises a 1365 nm Raman pump.

Pump 510 is set to a low power and pump 512 is set to a high power. In this example, pump 510 is set to a power of approximately 1 mW. Pump 512 is set to a power of approximately 1300 mW.

In operation, transmitter 502 transmits an optical signal over fiber span 504 to receiver 506. Concurrently, pump 510 backward pumps a light beam onto fiber span 504 through WDM muxs 508 and 509. Pump 512 also backward pumps a light beam onto fiber span 504 through WDM muxs 508 and 509. Based on the Raman effect, pumps 510 and 512 generate a gain in the optical signal traveling on fiber span 504. The gain mostly occurs in center portion 522 of fiber span 504.

More particularly, pump 510 backward pumps a light beam having a first order pump wavelength onto fiber span 504. Energy from the light beam having a first order pump wavelength moves to the wavelength of the optical signal. Pump 512 backward pumps a light beam having a second order pump wavelength onto fiber span 504. Energy from the light beam having a second order pump wavelength moves to the first order pump wavelength. The energy from the light beams provides enough power to generate the desired gain. The energy from the light beam having a second order pump wavelength provides increased energy to the light beam having the first order pump wavelength to prolong the gain distance along fiber span 504 more toward center portion 522.

The optical signal may also comprise wavelength-multiplexed optical signals. To generate a gain in the wavelength-multiplexed optical signals, pump 510 transmits wavelength-multiplexed light beams, having first order pump wavelengths, onto fiber span 504. Pump 512 transmits wavelength-multiplexed light beams, having second order pump wavelengths, onto fiber span 504. The wavelength-multiplexed pumps 510 and 512 generate a gain in the wavelength-multiplexed optical signals.

FIG. 6 illustrates a gain of the optical signal traveling on fiber span 504 of FIG. 5 in an example of the invention. Line 602 illustrates the energy of the light beam that pump 510 transmits on fiber span 504. Line 604 illustrates the energy of the light beam that pump 512 transmits on fiber span 504. Line 606 illustrates the gain in the optical signal generated by the laser pumps as the optical signal travels over fiber span 504.

Based on the low power of pump 510 and the high power of pump 512, the light beams generate the gain in center portion 522 of fiber span 504. The light beams may also generate a gain in receiver end 532. Preferably, the gain in receiver end 532 is nominal, and the gain in center portion 322 is greater than the gain in receiver end 532. FIG. 6 shows that there is no gain or a nominal gain in receiver end 532.

The light beams may also generate noise while generating the gain in the optical signal. Noise generated by the light beams is partially or wholly dispersed by fiber span 504 as the optical signal travels through center portion 522 and through receiver end 532. Dispersing the noise through the fiber advantageously provides a 3 to 5 dB Optical Signal-to-Noise Ratio (OSNR) improvement over prior systems.

What is claimed is:

1. An optical amplification system, comprising:
   a first order pump system configured to backward pump at a low pump power wavelength-multiplexed multiplexed light beams having first order pump wavelengths onto a fiber span carrying an optical signal, wherein the lowpower is below 30 mW; and
   a second order pump system configured to backward pump at a high pump power wavelength-multiplexed multiplexed light beams having second order pump wavelengths onto the fiber span
   the first order pump system and the second order pump system generating a first gain in the optical signal near the center of the fiber span based on the low power of the first order pump system and the high power of the second order pump system;
   the first gain near the center of the fiber span being greater than a second gain near a receiver end of the fiber span generated by the first order pump system and the second order pump system.

2. The optical amplification system of claim 1 further comprising:
   a Wavelength Division Multiplexing (WDM) multiplexer coupled to the fiber span, the first order pump system, and the second order pump system and configured to receive a first light beam from the first order pump system and a second light beam from the second order pump system and apply the first light beam and the second light beam to the fiber span.

3. The optical amplification system of claim 1 wherein the first order pump system is configured to backward pump onto the fiber span from the receiver end of the fiber span.

4. The optical amplification system of claim 1 wherein the low power of the first order pump system is approximately 1 mW.

5. The optical amplification system of claim 1 wherein the second order pump system is set above 400 mW.

6. The optical amplification system of claim 1 wherein the fiber span is approximately 80 km in length.

7. The optical amplification system of claim 1 wherein the fiber span comprises a single mode fiber.

8. The optical amplification system of claim 1 wherein the first gain near the center of the fiber span comprises at least 1 dB gain.

9. The optical amplification system of claim 1 wherein:
   the first order pump system comprises a 1455 nm Raman pump laser; and
   the second order pump system comprises a 1367 nm Raman pump laser.

10. A method of operating an optical amplification system comprising a first order pump system and a second order pump system, wherein the first order pump system and the second order pump system are coupled to a fiber span transporting an optical signal, the method comprising:
    backward pumping the first order pump system onto the fiber span, wherein the first order pump system is set to a low power and wherein the low power is below 30 mW; and
    backward pumping the second order pump system onto the fiber span, wherein the second order pump system is set to a high power;
    wherein the first order pump system and the second order pump system generate a first gain in the optical signal near the center of the fiber span based on the low power of the first order pump system and the high power of the second order pump system;

wherein the first gain near the center of the fiber span is greater than a second gain near a receiver end of the fiber span generated by the first order pump system and the second order pump system.

11. The method of claim 10 further comprising:

wavelength division multiplexing a first light beam from the first order pump system and a second light beam from the second order pump system onto the fiber span.

12. The method of claim 10 wherein backward pumping the first order pump system onto the fiber span comprises:

backward pumping the first order pump system onto the fiber span from the receiver end of the fiber span.

13. The method of claim 10 wherein the low power of the first order pump system is approximately 1 mW.

14. The method of claim 10 wherein the high power of the second order pump system comprises the high power above 400 mW.

15. The method of claim 10 wherein the fiber span comprises a span approximately 80 km in length.

16. The method of claim 10 wherein the fiber span comprises single mode fiber.

17. The method of claim 10 wherein:

the step of backward pumping the first order pump system comprises backward pumping wavelength-multiplexed light beams having first order pump wavelengths onto the fiber span; and the step of backward pumping the second order pump system comprises backward pumping wavelength-multiplexed light beams having second order pump wavelengths onto the fiber span.

18. The method of claim 10 wherein the first gain near the center of the fiber span comprises at least 1 dB gain.

19. The method of claim 10 wherein:

backward pumping the first order pump system onto the fiber span comprises backward pumping a 1455 nm Raman laser pump onto the fiber span; and backward pumping the second order pump system onto the fiber span comprises backward pumping a 1367 nm Raman laser pump onto the fiber span.

* * * * *